May 27, 1958 W. G. HOELSCHER 2,836,086
CLAMPING AND ELEVATING APPARATUS FOR MACHINE TOOLS
Filed Aug. 9, 1956 11 Sheets-Sheet 1

INVENTOR.
William G. Hoelscher
BY
Wood, Herron & Evans
ATTORNEYS.

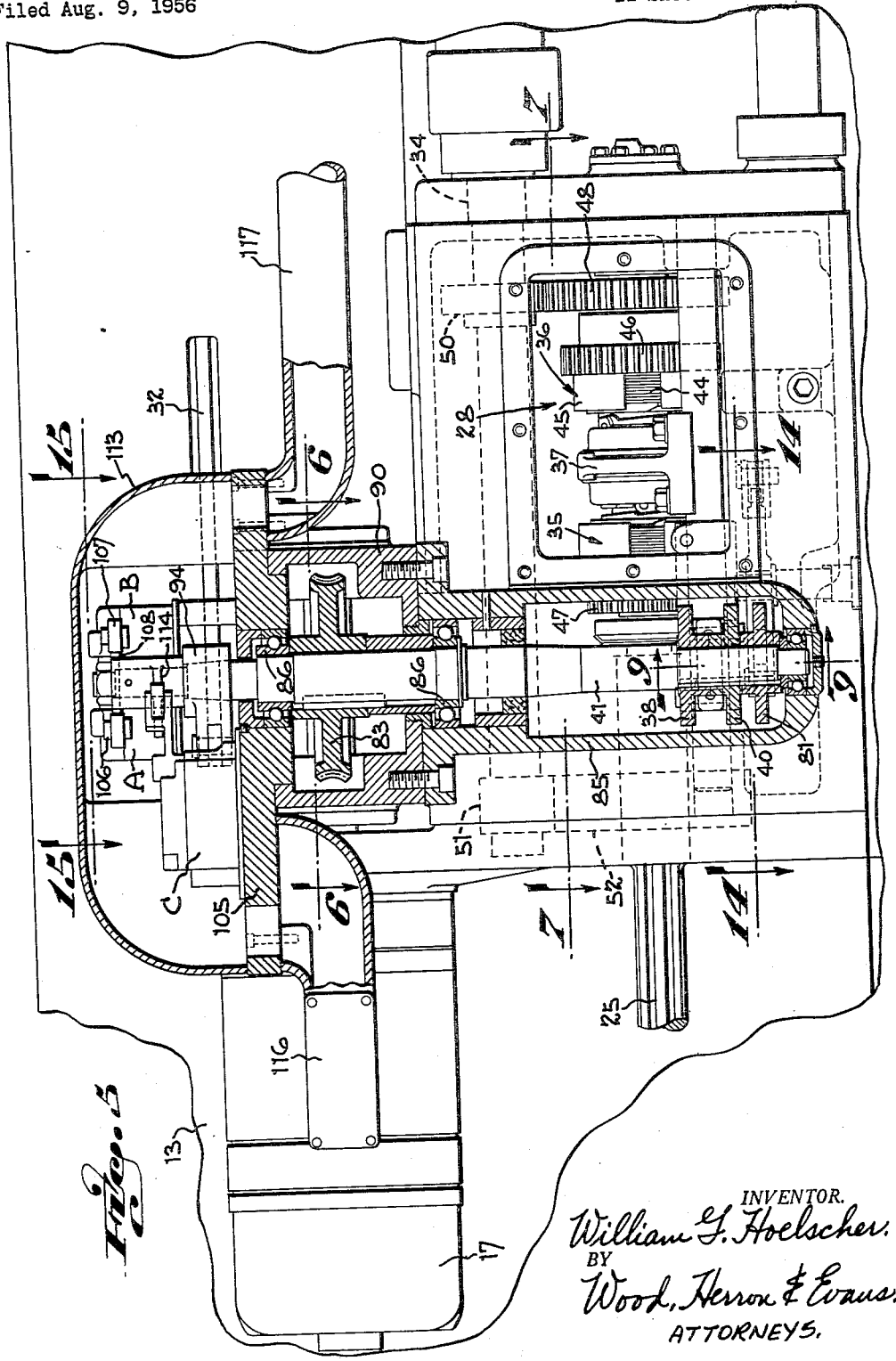

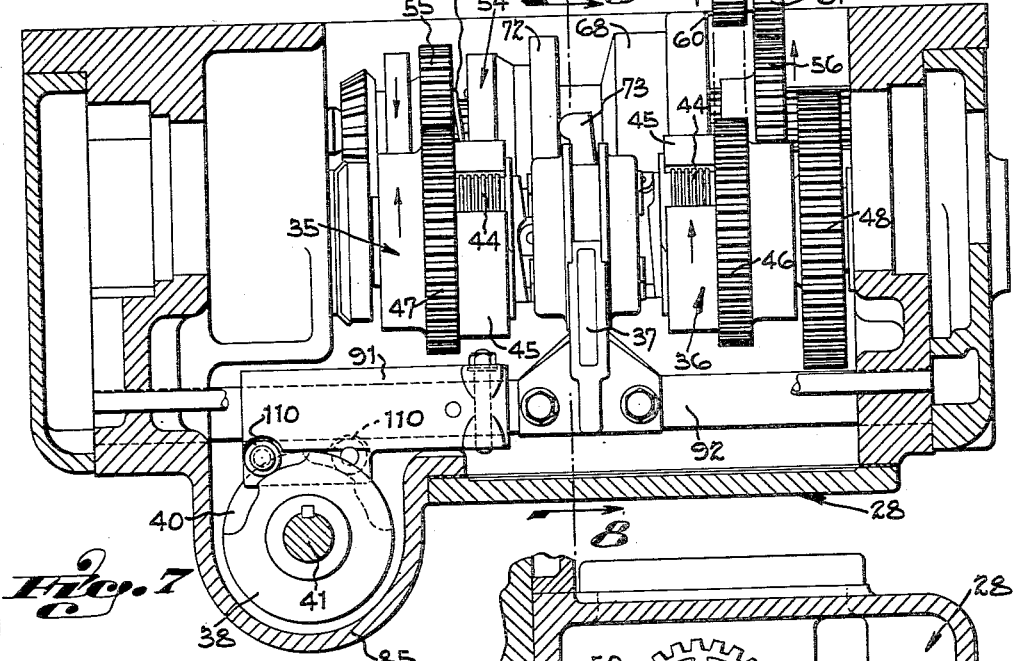
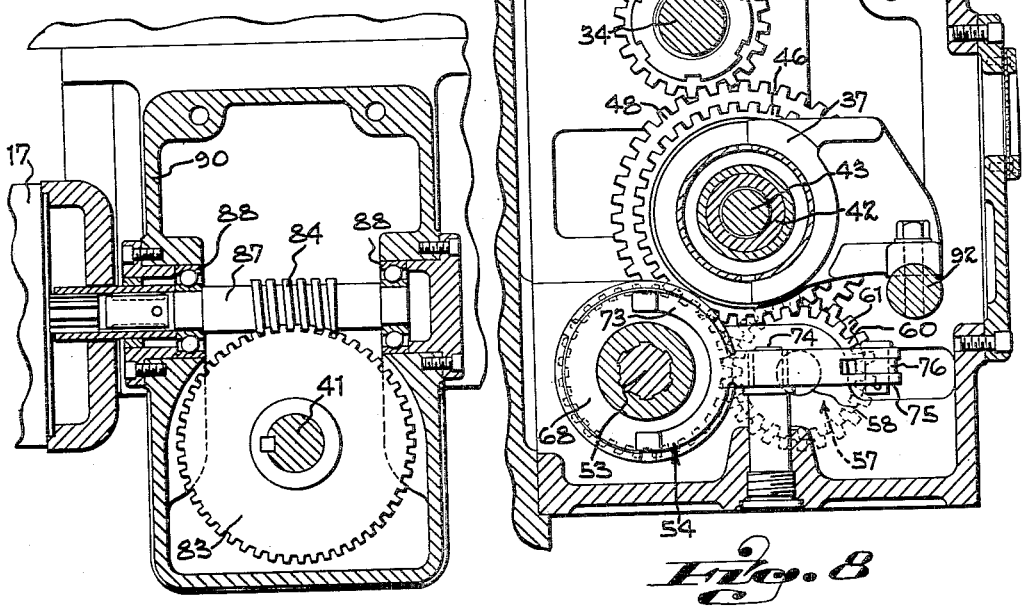

May 27, 1958 W. G. HOELSCHER 2,836,086
CLAMPING AND ELEVATING APPARATUS FOR MACHINE TOOLS
Filed Aug. 9, 1956 11 Sheets-Sheet 4
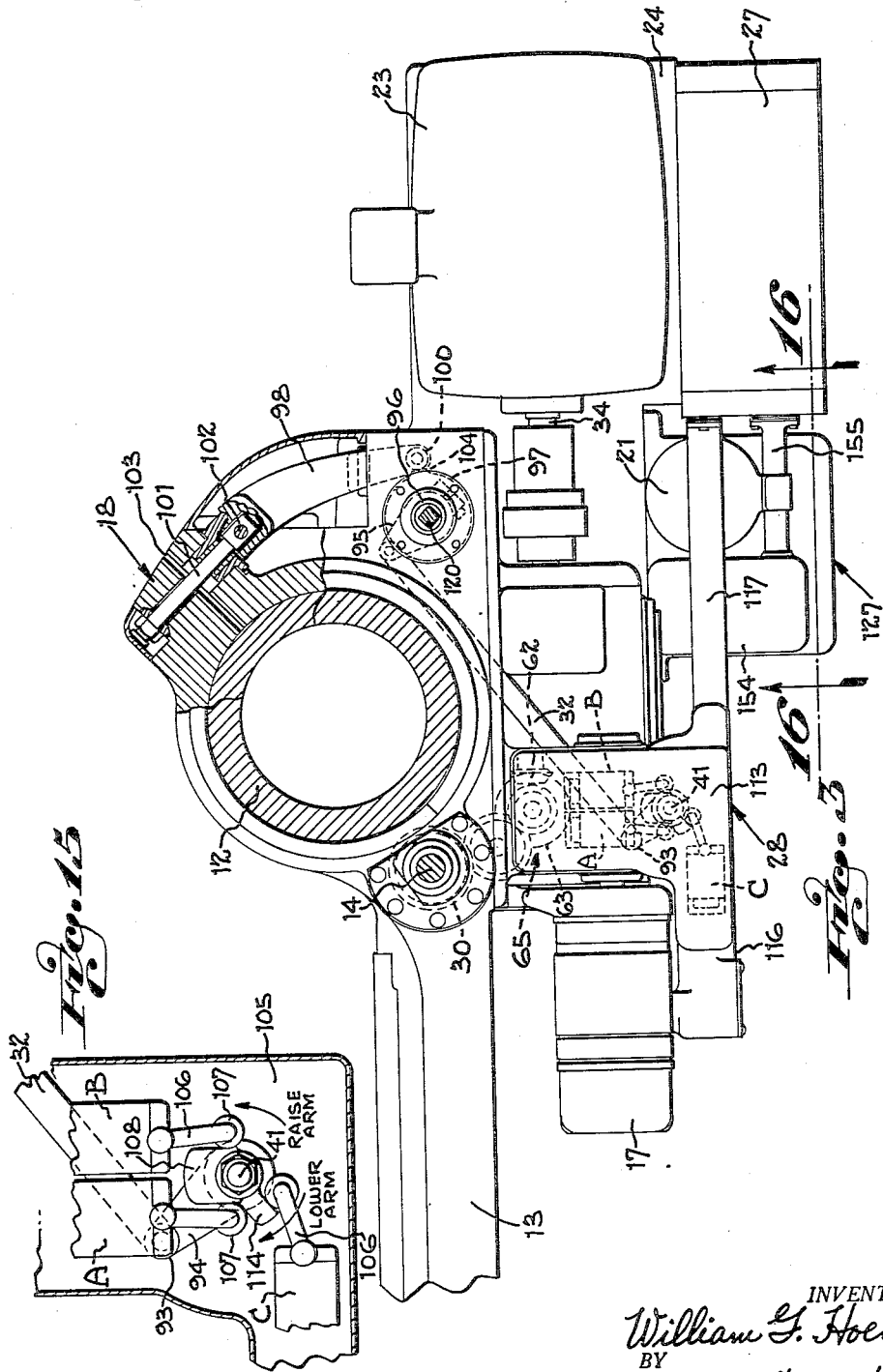
INVENTOR.
William G. Hoelscher
BY
Wood, Herron & Evans.
ATTORNEYS.

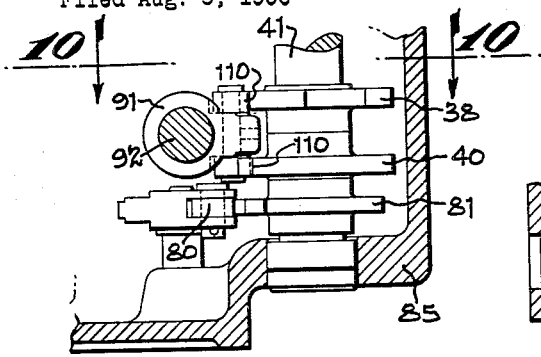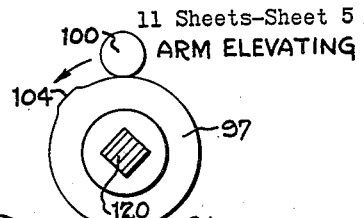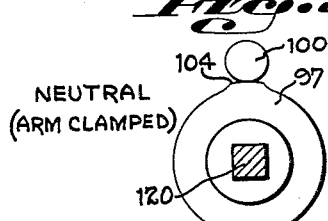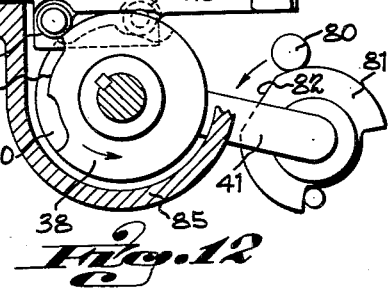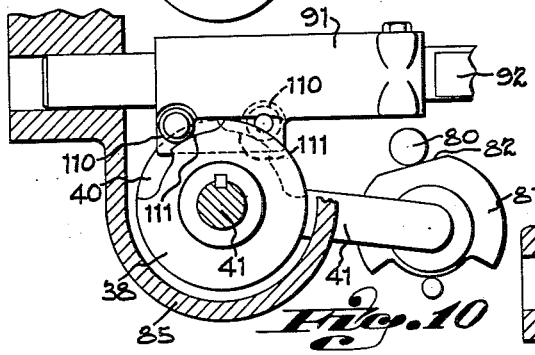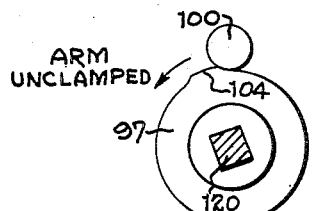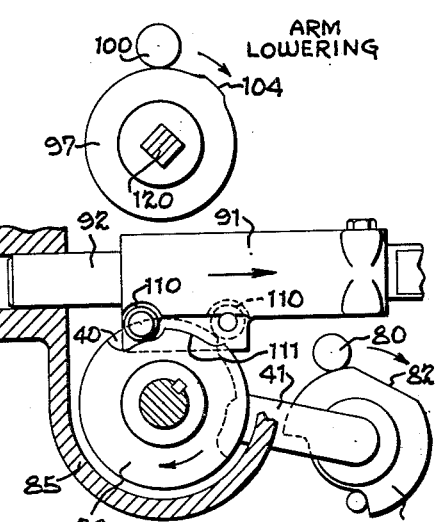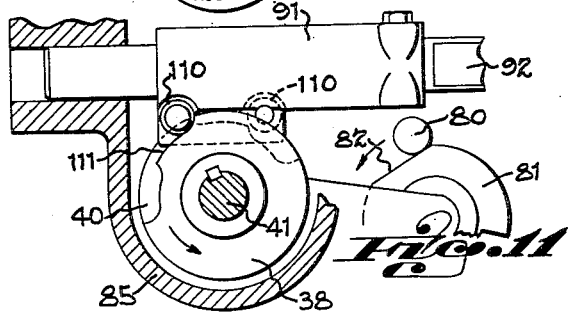

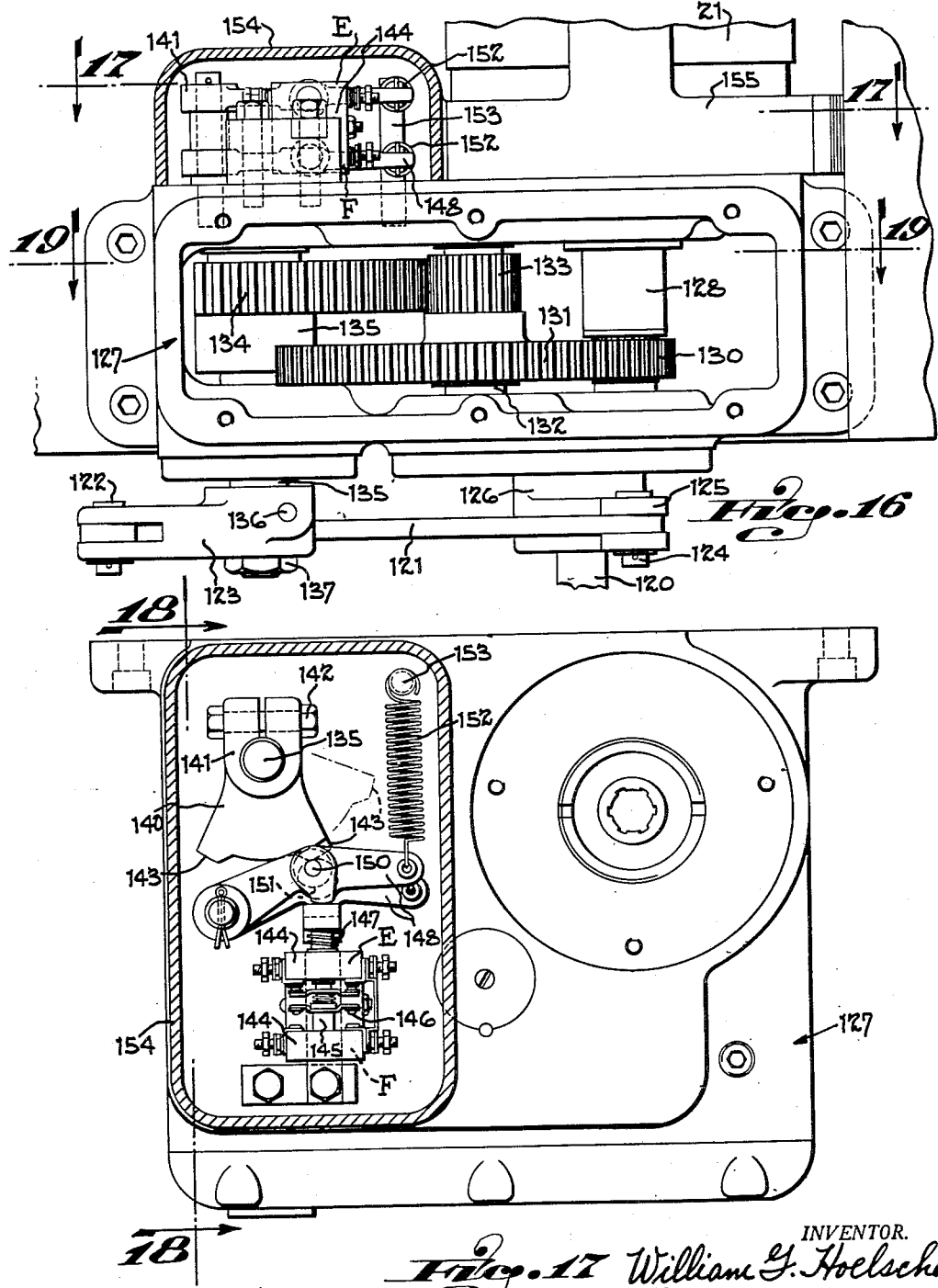

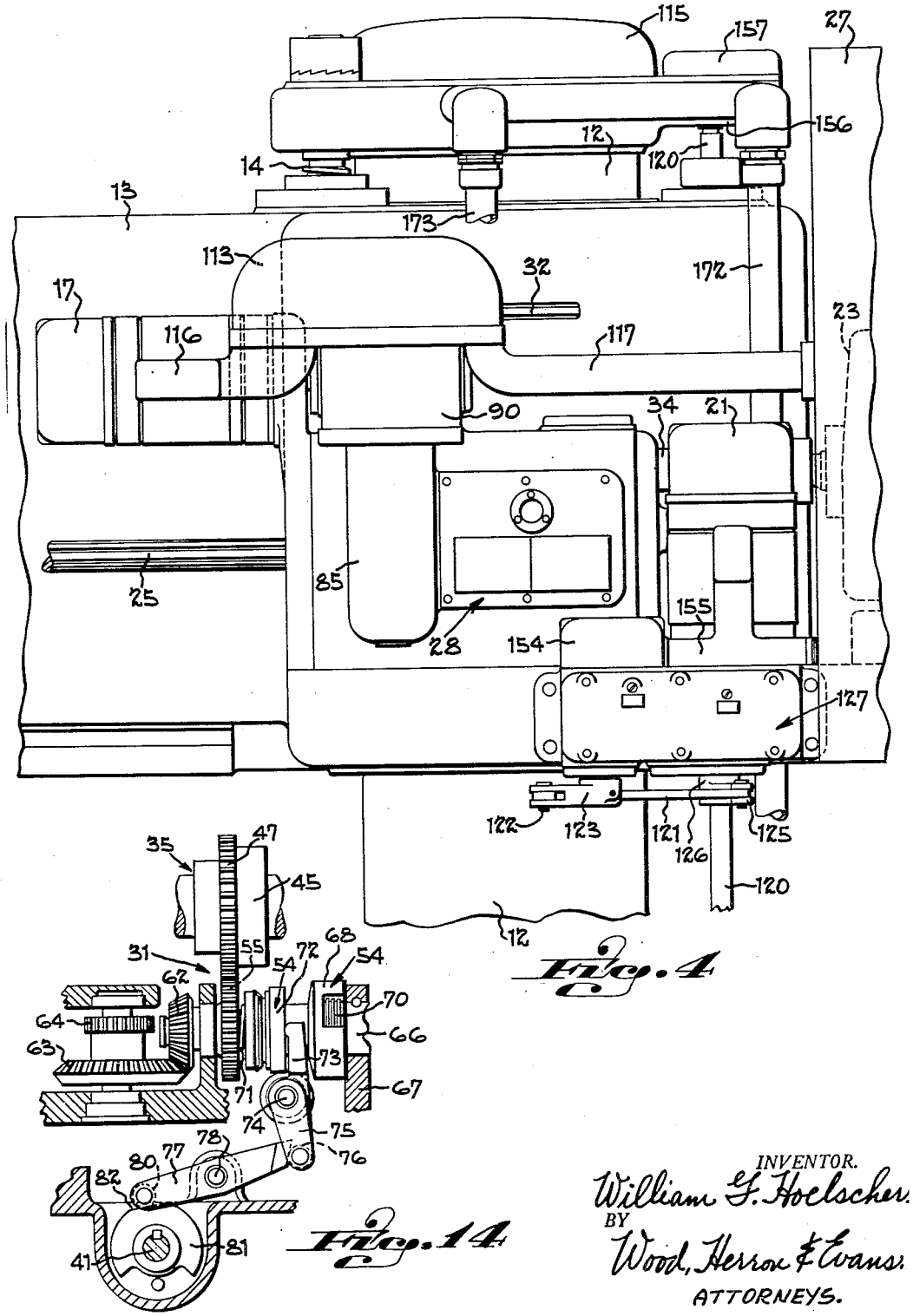

May 27, 1958  W. G. HOELSCHER  2,836,086
CLAMPING AND ELEVATING APPARATUS FOR MACHINE TOOLS
Filed Aug. 9, 1956  11 Sheets-Sheet 8

INVENTOR.
William G. Hoelscher
BY
Wood, Herron & Evans
ATTORNEYS.

May 27, 1958  W. G. HOELSCHER  2,836,086
CLAMPING AND ELEVATING APPARATUS FOR MACHINE TOOLS
Filed Aug. 9, 1956  11 Sheets-Sheet 9

INVENTOR.
William F. Hoelscher.
BY
Wood, Herron & Evans.
ATTORNEYS.

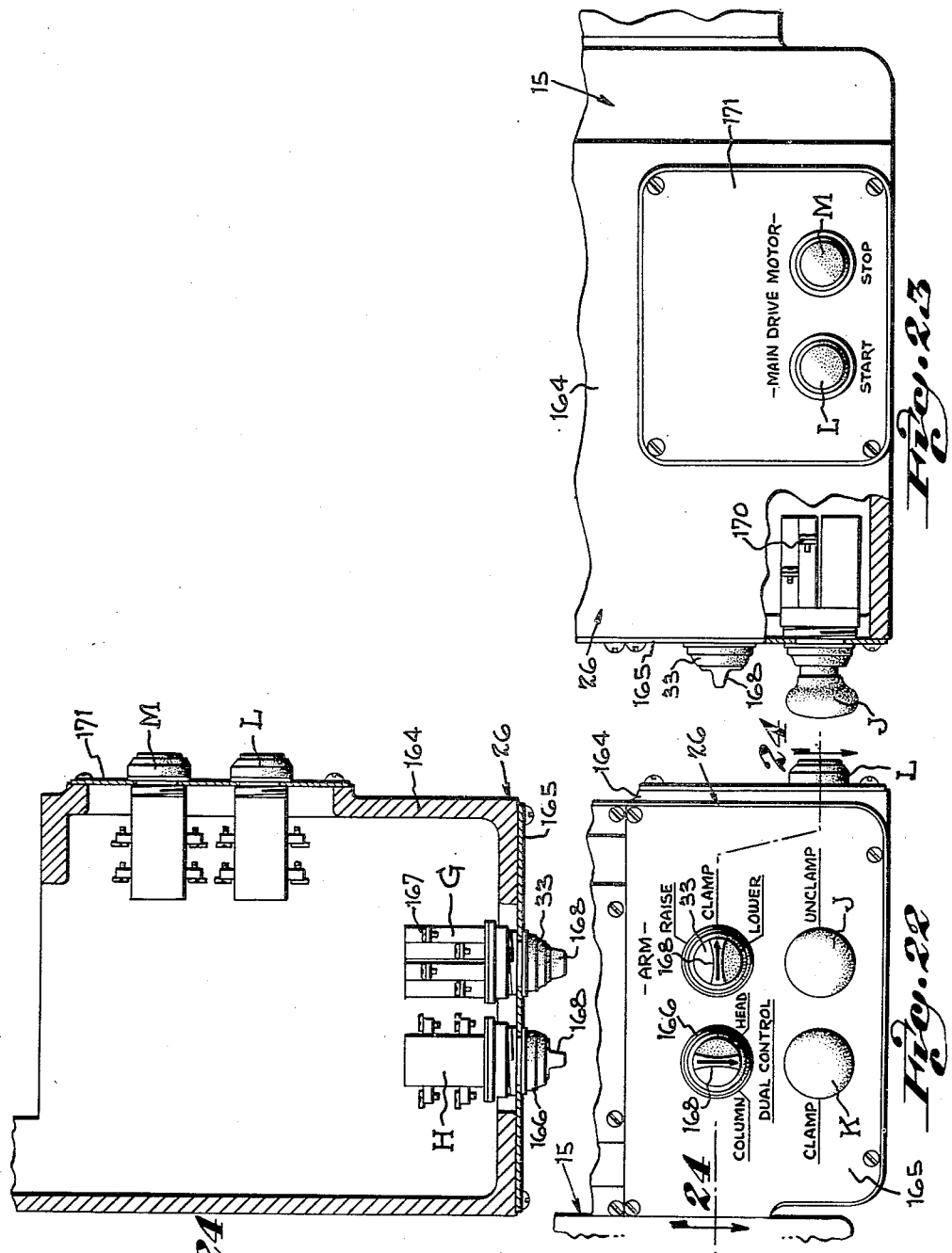

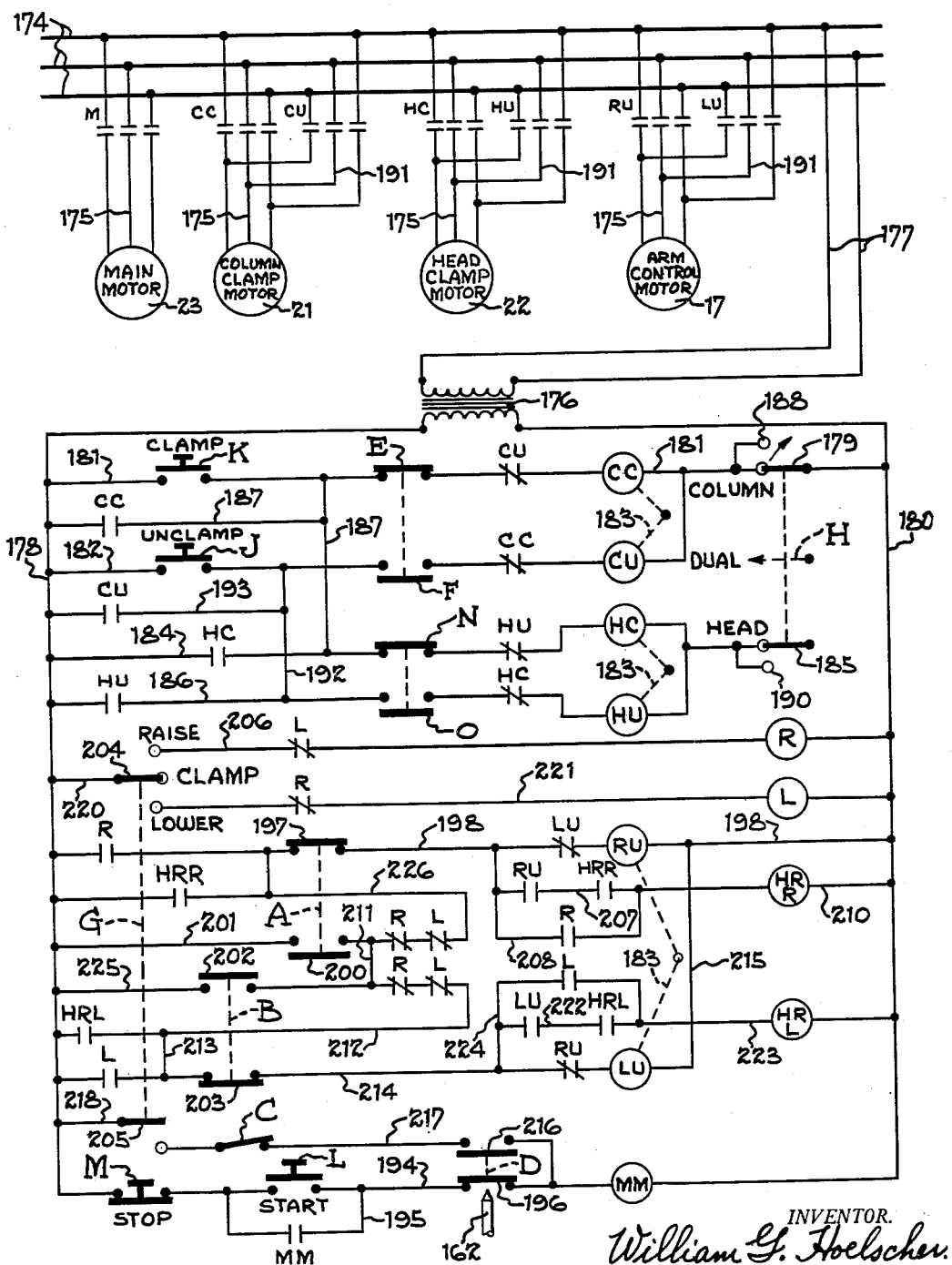

United States Patent Office 2,836,086
Patented May 27, 1958

2,836,086

CLAMPING AND ELEVATING APPARATUS FOR MACHINE TOOLS

William G. Hoelscher, Cincinnati, Ohio, assignor to The American Tool Works Company, Cincinnati, Ohio, a corporation of Ohio Application August 9, 1956, Serial No. 603,001

14 Claims. (Cl. 77—28)

This invention relates to radial drills and has particular reference to an apparatus which provides rapid, precise regulation of the arm movements and clamping mechanisms, utilizing a centralized electrical switch unit mounted on the drill head at the operator's station for remote control of the several mechanisms.

A typical radial drill comprises a base having a rotatable column, an arm slidably keyed for vertical motion along the column, and a drill head shiftably mounted upon the arm. The drill head includes a rotating spindle in which the drilling tool is mounted. In setting up the machine to drill a hole in the work piece, which is mounted upon the base, the operator aligns the spindle with the hole center by swinging the arm manually above the work piece in an arc and by shifting the head lineally along the arm. The proper elevation of the spindle is obtained by raising or lowering the arm with respect to the column. When the spindle is precisely aligned, the arm is clamped to the column, a column clamp is actuated to lock the column (and arm) against arcuate motion, and a head clamp is actuated to lock the head to the arm. With the adjustable components rigidly locked, the machining operation is executed by rotating the spindle and feeding the spindle and its tool downwardly into the work piece.

The clamping mechanisms of the conventional drill may be operated either manually or by power, utilizing electric or hydraulic motors which are controlled by manual control means such as levers. To permit the operator to swing the arm with relative ease, the column usually is journalled upon antifriction bearings and the arm is carried in a substantially balanced position by the column. However, the ease of arm motion allows the spindle to be displaced from its precisely aligned position in response to relatively light pressure which may be brought to bear, for example, in shifting the manual control means of the clamps and elevating mechanism.

The present invention is directed primarily to an electrical apparatus for actuating an electric column clamp motor and an electric head clamp motor; it is also directed to a motor controlled arm elevating and clamping mechanism. The specific mechanical construction of the column clamp and head clamp does not form a part of the present invention; however, an electrically operated head clamp and column clamp, for which the system is intended, are shown in the co-pending applications of William G. Hoelscher, Serial Nos. 558,253, filed on January 10, 1956, and 571,032, filed on March 12, 1956. The control apparatus of the present application regulates the reversible motors of the head clamp and column clamp, as well as the arm elevating and clamping mechanism.

One of the primary objectives of the invention has been to provide an electrical control apparatus having a centralized group of regulating switches mounted in a control box on the drill head adjacent the spindle, enabling the operator, by remote control, from a centralized station, to actuate the column clamp motor and head clamp motor, and also the control motor of the arm elevating and clamping mechanism. Since the control switches are actuated with very little force, the arrangement eliminates the tendency to displace the arm and spindle from selected position as the elevating and clamping mechanisms are actuated; moreover, the centralized grouping of the switches allows the operator closely to observe the relative position of the tool and hole center during the clamping and arm elevating operations. The centralized grouping of the switches has the further advantage of increasing speed and precision since it is unnecessary for the operator to move from his control station at any time while setting up the machine and placing the spindle in operation.

A further objective has been to provide, as part of the control box a set of push-button switches (clamp and unclamp) which provide either dual control of the column and head clamps, or operation of the two clamps independently of one another. For this purpose, the control box includes a clamp selector switch which may be set either for dual control of the clamps or for operation of the head clamp or column clamp independently of one another. Under dual control, a great deal of time is saved in adjusting the arm and head; moreover, the spindle may be set more precisely since both clamps may be clamped rigidly as soon as accurate spindle alignment is obtained.

Another feature of the selective clamping system rises from the fact that the control apparatus provides independent cycles of both clamping mechanisms when under dual control, such that each clamping mechanism goes through its complete clamping or unclamping cycle, independently of the other, in response to actuation of either push-button. The independent cycling of the clamping mechanism makes them self-responsive to the push-button signals. For example, should one of the clamps be engaged when a signal is sent for dual clamping, only the clamp which is disengaged will be energized through its cycles; if both clamps are disengaged, then both are energized through their clamping cycles.

A further objective has been to provide, as part of the centralized control box, an arm selector switch which is rotated to three positions to raise the arm, clamp it to the column, or to lower the arm. The arm elevating mechanism, which is controlled by the arm selector switch, in general, comprises an elevating nut rotatably carried in the arm and threaded upon an elevating screw suspended from the top of the column. The nut is driven in forward and reverse directions by the elevating mechanism which includes forward and reverse clutches driven from the main motor of the machine tool. These clutches are shifted by a reversible arm control motor which also actuates the arm clamp as an incident of the clutch shifting operation. The control motor disengages the arm clamp upon shifting the clutches for raising or lowering the arm, and engages the clamp upon disengaging the clutches.

The control apparatus for the arm elevating mechanism, similar to the head clamp and column clamp, also is arranged to complete its own cycle when the selector switch is shifted to raise, lower, or clamp the arm. Thus, when the selector switch is shifted to move the arm, the arm control motor operates through its cycle, then de-energizes itself, while the arm continues to move in the selected direction. When the selector switch is shifted back to its neutral or arm clamping position, then the arm control motor shifts the mechanism back to its neutral position, with the clutches disengaged and the arm clamp engaged. This restores the electrical control circuit for again shifting the arm in either direction in response to the movement of the selector switch.

A further objective has been to provide a safety switch which deenergizes the main motor in the event the operator inadvertently causes the arm to be elevated beyond a predetermined limit, thereby preventing the arm from striking the cap at the top of the column, with possible damage to the machine. The control apparatus is so arranged that upon being tripped, the safety switch not only deenergizes the main motor, but makes it necessary to shift the arm selector switch for downward arm motion before the main motor can again be energized. This prevents the operator from accidentally starting the main motor with the controls set for arm raising motion when the arm has already reached its upper limit.

Briefly therefore, the present invention provides rapid operation of the column clamp, head clamp and arm clamp, thereby increasing the productivity of the machine by eliminating manual effort on the part of the operator. Moreover, the centralized control system provides greater precision in aligning the spindle since the push-button and directional control switches are grouped near the spindle where the exact tool position is clearly visible. The drawings disclose the motor controlled arm elevating and clamping mechanism and the control system for regulating the cycles of this mechanism as well as the cycles of the column clamp and head clamp motors. As noted above, the specific construction of the column clamp and head clamp has been omitted from the present disclosure.

In the drawings:

Figure 3 is an enlarged sectional plan view taken along line 3—3 of Figure 1, showing the general arrangement of the elevating and clamping mechanism, a portion of the arm being broken away to show the arm clamp.

Figure 4 is an enlarged fragmentary rear view taken from Figure 1, showing the exterior arrangement of the arm elevating and clamping mechanism; also, the column clamping mechanism.

Figure 5 is a view similar to Figure 4, with the covers removed to illustrate the interior components of the arm elevating and clamping mechanism.

Figure 6 is a sectional view taken along line 6—6 of Figure 5, showing the motor drive of the arm mechanism.

Figure 7 is a sectional view taken along line 7—7 of Figure 5, detailing the reversing drive system of the arm elevating mechanism.

Figure 8 is a sectional view taken along line 8—8 of Figure 7, further illustrating the driving system of Figure 7.

Figure 9 is a fragmentary sectional view taken along line 9—9 of Figure 5, illustrating the clutch and brake cams of the arm mechanism.

Figure 10 is a sectional plan view taken along line 10—10 of Figure 9, diagrammatically illustrating the cams in their neutral position. In this view, the brake cam, which is also mounted on the cam shaft, is shown in braking position and the arm clamping cam is shown in clamping position.

Figure 11 is similar to Figure 10, showing the clutch cams shifting partially toward elevating position, with the brake and arm clamp cams shifted to release position.

Figure 12 shows the position of the parts upon being shifted fully to clutch-engaging, arm-elevating position.

Figure 13 shows the parts shifted to arm lowering position with the brake and arm clamp released.

Figure 14 is a view taken along line 14—14 of Figure 5, showing the brake cam, its actuating linkage, and the gear train to the elevating nut.

Figure 15 is an enlarged sectional view of the switches and cams which control the motor of the arm elevating and lowering mechanism. This view is taken from Figure 3 and is indicated along the line 15—15 of Figure 5.

Figure 16 is a view, partially in section, taken along line 16—16 of Figure 3, illustrating the power drive for the column clamping mechanism.

Figure 17 is a sectional view taken along line 17—17 of Figure 16, illustrating the limit switches of the column clamp motor.

Figure 22 is an enlarged front elevation of the centralized control box taken from Figure 2.

Figure 23 is a side elevation of the control box projected from Figure 22.

Figure 24 is a sectional view taken along line 24—24 of Figure 22.

Figure 25 is an electrical diagram of the control circuit.

*General arrangement*

Figures 1, 2:
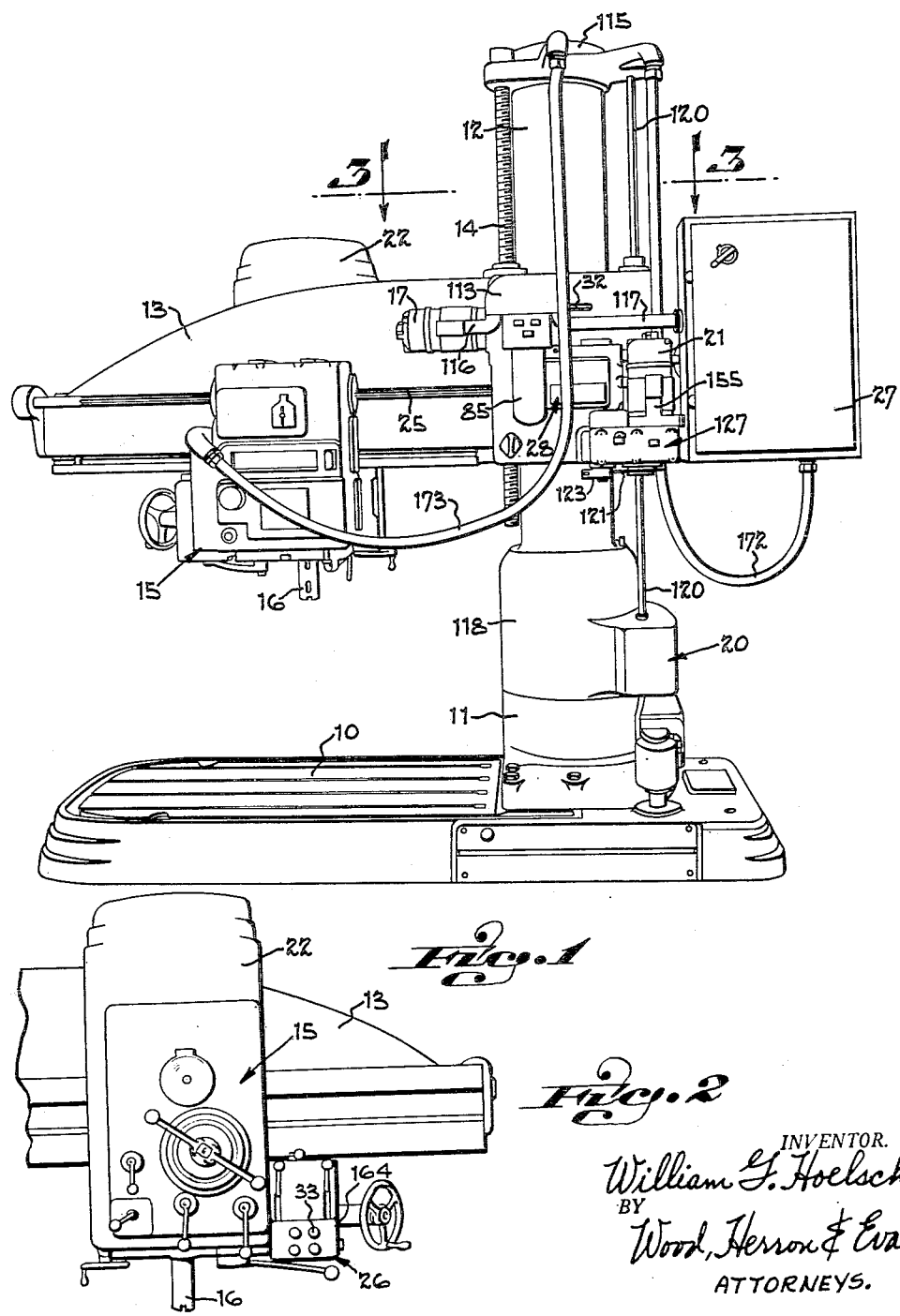
Figure 1 is a rear elevation of a radial drill equipped with the mechanism of this invention.
Figure 2 is a fragmentary view of the head and arm as viewed from the front or operator's side.
Figure 18:
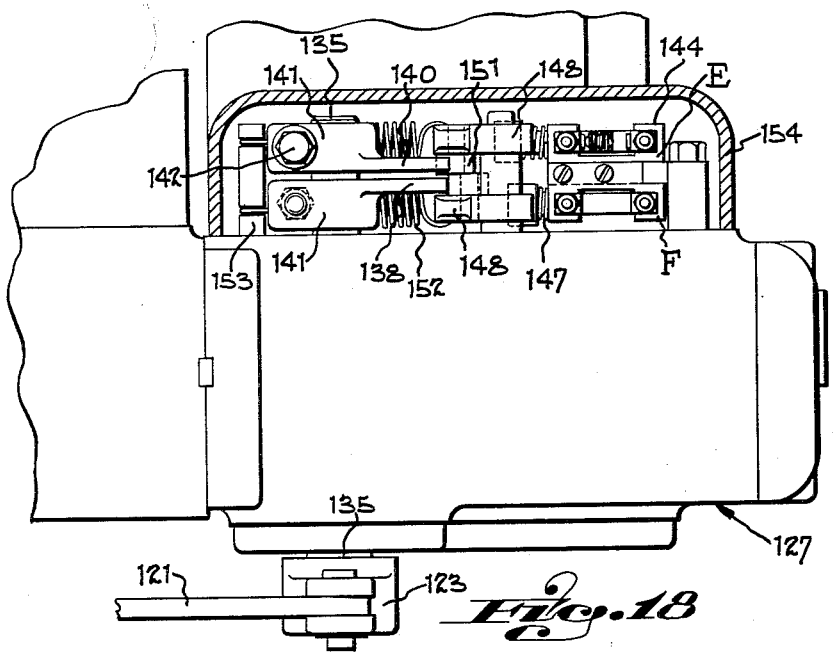
Figure 18 is a sectional view taken along line 18—18 of Figure 17, further illustrating the column clamp limit switches.

The radial drill shown in Figures 1 and 2 comprises a base 10 upon which the work is mounted and a stump 11 bolted to the base and rotatably journalling a vertical column 12. The arm 13 is slidably keyed to the column and is shiftable vertically by means of a power-driven elevating nut (described later) threaded upon an elevating screw 14 which is suspended from the top of the column. The drill head 15 on the arm includes a spindle 16 which may be equipped with a number of different types of tools such as drills, reamers, taps or counter boring tools, depending upon the nature of the work.

In operating the machine, as noted earlier, the arm is raised or lowered as required, the head is shifted lengthwise along the arm, and the arm is swung radially to position the axis of the spindle with the hole center. With the spindle centered and the arm clamped, the head is clamped to the arm, the column is clamped to the stump, then the drill spindle is rotated and fed downwardly to machine the hole.

As described in detail later, the arm clamp is interconnected with the elevating mechanism, such that the clamp is disengaged in an automatic manner when the elevating mechanism is activated to raise or lower the arm. The arm clamping and elevating mechanism is actuated by the reversible arm control motor indicated at 17 in Figure 1, which is mounted upon the portion of the arm which embraces the column. The arm clamp is indicated generally at 18 in Figure 3.

The column clamp, which is indicated generally at 20, in Figure 1, is actuated by the reversible column clamp motor 21 which is also mounted upon the arm near the column.

The head clamp (not shown) is driven by a reversible motor 22 mounted in the upper portion of the head, as indicated in Figure 2.

Power for rotating and feeding the drill spindle 16 is supplied by the main motor 23 (Figure 3) which is mounted upon an overhanging portion 24 of the arm and connected to the head by a spline shaft 25 (Figures 1 and 4) extending parallel with the arm. The spline shaft provides a sliding but non-rotatable driving connection with the transmission of the head. The spindle control mechanism, which is mounted on the front of the head, is not pertinent to the invention and the details have been omitted from the drawings.

The head clamping mechanism is shown in the aforesaid co-pending application, Serial No. 571,032 and the column clamping mechanism 20 is shown in the co-pending application, Serial No. 558,253. Operation of the head clamp motor 22, arm control motor 17, column clamp motor 21, and main motor 23 is controlled by switches mounted in the centralized control box 26, which is carried on the operator's side of the head as shown in Figures 2 and 22–24.

As noted earlier, the present invention is directed primarily to the control apparatus for operating the head clamp motor 22, the column clamp motor 21, and the arm control motor 17 which regulates arm elevating and clamping. The arrangement is such that the operator may precisely align the spindle with the hole center in a rapid convenient manner and with very little manual effort. The head and column clamping motors as well as the arm control motor are disclosed in the control circuit of Figure 25, as described in detail later. The control circuit, and most of its components are mounted in the electrical cabinet 27 (Figure 1) which is mounted upon the arm alongside the main motor 23.

*Arm elevating and clamping mechanism*

The mechanism for raising and lowering the arm is enclosed in a gear box indicated at 28 at Figures 1, 3 and 7. The power for this mechanism is derived from the main motor 23 driving through a pair of clutches in the gear box which provide forward and reverse rotation of the elevating nut 30 (Figure 3). These clutches are shifted by the arm control motor 17, which in turn, is remotely controlled from control box 26. The gear box is in driving connection with the elevating nut 30 by means of the gear train indicated generally at 31 in Figure 14.

The arm normally is clamped to the column by the clamping mechanism 18, which is connected by a link 32 to the cam-operated lever in the gear box as explained later. The arrangement is such that the arm clamping pressure is applied when the two clutches are in a neutral position, and is released in an automatic manner when either of the clutches is shifted to raise or lower the arm. In other words, before the arm can be shifted, the arm clamp necessarily must be released.

For controlling the arm elevating and clamping mechanism, the centralized control box 26 at the front or operating side of the drill head, is provided with a directional control knob 33, actuating a rotary selector switch, as described later, which upon being rotated in either direction from a neutral arm clamping position, shifts one of the clutches into an engaged position, and at the same time, releases the arm clamp. The rotary arm selector switch is interconnected in the control circuit as described later. In order to prevent the arm from over-turning under the momentum effect of its gear train, a braking mechanism, also described later, is interposed in the gear train. The brake, which is normally engaged, locks the elevating nut against rotation when the elevating mechanism is inactive, with the arm clamp engaged.

The clutches and other driving components of the elevating nut are best described with reference to Figures 5 to 13. Referring particularly to Figure 7, gear box 28 is bolted directly on one side of the arm 13 and the main drive shaft 34 (main motor 23) is journalled in its upper portion. The arm elevating clutch is indicated generally at 35 and the lowering clutch is indicated at 36. The clutches are alternately engaged by a yoke 37, which is shifted to the right or left by the clutch cams 38 and 40. These cams are keyed upon a rock shaft 41 which in turn, is rotated in forward and reverse directions by the arm control motor 17. The clutches are of the friction type and are engaged when pressure is applied to them by the yoke 37. The clutches and several other components of the nut driving mechanism are of conventional design and for this reason, need not be described in detail.

As seen in Figure 8, the clutches are mounted upon a sleeve 42 which in turn, is journalled on a pilot shaft 43. Each clutch includes sets of friction disks 44, one set of disks being keyed to the sleeve 42 and the companion set being keyed to the external clutch drum 45. Each clutch drum includes a driving gear 46 or 47, which transmit power in forward or reverse to the elevating nut 30 through the nut gear train 31 (Figure 14). Power is transmitted to the clutches by a main driving gear 48, which is keyed to the clutch driving sleeve 42. A pinion 50, keyed to an extension of the main motor shaft 34, powers the clutch driving gear.

With the yoke 37 in the neutral position shown, both clutches are in neutral or disengaged position and the main clutch driving gear 48 (and its sleeve 42) is free to rotate without driving the nut. The main motor runs continuously while the machine is in operation and transmits power to the spline shaft 25 which drives the drill head as noted earlier. For this purpose, the main shaft 34 in the upper portion of the gear box includes a pinion 51 meshing with a gear 52 which is keyed to a sleeve (not shown) splined shaft 25 being in driving connection with the sleeve and thus rotated continuously by the main motor. The spline shaft and its sleeve are co-axial with the pilot shaft 43 and their adjoining ends are held in alignment by a pilot bearing (not shown).

The transmission for driving the nut comprises the splined nut, drive shaft 53 (Figure 8), journalled in the gear box below the clutch pilot shaft 43. The brake, indicated generally at 54, is mounted on the shaft 53 between a forward nut driving gear 55 and a reverse nut driving gear 56. It will be noted in Figures 7 and 8, that the gear 55, which drives the nut shaft 53 in elevating direction, meshes directly with the gear 47 of the elevating clutch. The companion gear 56, which drives the nut shaft 53 in lowering direction, is driven in the reverse direction by a gear coupler 57 mounted upon an idler shaft 58, the coupler having one of its gears 60 meshing with the gear 46 of the arm lowering clutch. A second gear 61 of couple meshes with the reversing gear 56 of the nut driving shaft 53. It will be seen in Figure 7, that when the elevating clutch 35 is engaged, its gear 47 rotates in the direction indicated to drive gear 55 and nut drive shaft 53 in elevating direction; when the lowering clutch 36 is engaged, its gear 46 drives through reversing gear coupler 57 to drive the gear 56 and nut shaft 53 in the opposite or lowering direction.

As shown in Figure 14, the nut gear train, which is driven by shaft 53, includes a bevel gear 62 meshing with a companion bevel gear 63. Companion bevel gear 63 includes a gear 64 meshing with a gear train 65 to the nut 30, as indicated in Figure 3.

The brake 54 (Figure 14) includes a stationary internal brake drum 66 pinned to a lug 67 in the gear box, and a rotating external drum 68, with sets of braking disks 70 connected to the stationary and movable elements. The rotating external drum 68 is normally urged toward the stationary drum 66 by a compression spring 71. The external drum includes a thrust ring 72 engaged by a yoke 73 pivoted as at 74 in the housing, and having a lever end 75 projecting outwardly and carrying a roller 76. A second lever 77 pivoted as at 78 to the gear box, has one end in camming engagement with the roller 76 of the yoke lever, and its oposite end includes a roller 80 in bearing engagement with the brake cam 81 keyed to rock shaft 41. The brake cam includes a flat 82, and upon rotation, forces the yoke 73 toward the left as viewed in Figure 14, so as to release the brake.

As shown in Figures 5 and 6, the reversible arm control motor 17, which is mounted directly upon the gear box, is connected to rock shaft 41 by a worm wheel 83 keyed to the shaft and driven by a worm 84 keyed to the motor shaft. The gear box includes a vertical housing 85 including bearings 86 which journal rock shaft 41. The worm 84 is carried on a cross shaft 87 which is journalled in bearings 88 located in the upper portion 90 of the vertical housing. The lower portion of housing 85 is open to the gear box, as shown in Figures 7 and 9, for interconnection with a sleeve 91 which shifts the clutch yoke 37 and thrust element of the clutches. The sleeve and its yoke are attached to a slide rod 92 shiftably mounted within the gear box 28. The brake cam 81 is mounted below the clutch cams 38 and 40 and its operating lever also projects through the vertical housing 85 for actuation by cam 81.

The link 32, which actuates the arm clamp 18, is pivotally connected as at 93 to a short lever 94 keyed to to upper portion of the rock shaft (Figures 5 and 15). The link extends across the top of gear box 28 and its opposite end is pivotally connected to a lever 95 of a sleeve 96 rotatably journalled in the arm (Figure 3). Sleeve 96 includes a cam 97 which actuates an arm clamping lever 98, lever 98 having a roller 100 presented to the cam. A clamping bolt 101 is pivoted as at 102 to the end of clamping levers 98, the arm having a split portion 103 through which the bolt passes. Cam 97 includes a lobe 104 which forces the clamping lever 98 outwardly to clamping position as shown in Figure 3. It will be understod from this point that when the link is shifted in either direction from the position shown, the cam is rotated to unclamp the arm.

Arm control apparatus

The arm control apparatus forms a part of the present invention and controls the cycling of the arm elevating and clamping mechanism described above. Three limit switches, indicated at A, B, and C in Figures 5 and 15, are mounted upon the top of vertical housing 85 and controls the operation of the arm control motor 17 in response to the selector knob 33 of the centralized control box 26. Switches A and B each include an actuating arm 106 having a roller 107 presented to a cam 108 fixed to the upper end of rock shaft 41. The switches A and B, in conjunction with the control circuit later described, control the cycles of motor 17.

It will be noted that the limit switch cam 108, the clutch actuating cams 38 and 40, and brake cam 81 are all mounted on rock shaft 41. The arm clamping cam 97 is mounted in another portion of the arm, however; for convenience, it is shown in the diagrams (Figures 10–13) adjacent the rock shaft. As shown in these views, the clutch sleeve 91 includes a pair of rollers 110, one presented to clutch cam 38 and second presented to the lower cam 40 (Figure 9). In the neutral or disengaged position of the arm elevating clutches 38 and 40 shown in Figure 10, the recessed portion 111 of both cams is presented to the rollers and the lobe 104 of arm clamp cam 97 is presented to its roller 100 to clamp the arm. The flat 82 of the brake cam is also presented to its roller 80 to engage the brake.

When motor 17 is energized to rock the shaft 41 in the direction shown in Figure 11, to elevate the arm, the arm clamping cam 97 and brake cam 81 rotate to release the arm clamp and brake before the recess 111 engages the roller 110 to shift the sleeve and clutch yoke 37. Continued rotation in the direction shown in Figure 11, shifts the sleeve and its yoke to the left, thus engaging the elevating clutch 35 and causing rotation of nut 30 in arm raising direction. It is to be noted that the arm clamp and brake will have been released before the clutch is engaged so as to prevent any strain upon the driving mechanism. When control motor 17 is energized to stop the elevating motion, the rock shaft and cams rotate back to the position shown in Figure 10 to disengage clutch 35 to apply the arm clamp and brake.

When the motor is energized in the direction to lower the arm as shown in Figure 13, the arm clamp and brake are first released, as above, then the sleeve and its yoke are shifted to the right as indicated, so as to engage the right hand lowering clutch 36 which drives the nut in the opposite direction through the reversing gears as indicated earlier. In each of the two positions shown in Figures 12 and 13, the control motor 17 is deenergized at the limit of its motion by the switches A or B as described later.

The third switch C serves as a safety device in connection with the column limit switch as described later. The safety switch C is tripped to a closed position by a cam 114 when the rock shaft 41 is rocked to arm elevating position as indicated by the arrow in Figure 15. As described with reference to the control circuit, the main motor 23 is deenerzied by a top limit switch D (Figure 20) in the event that the arm is elevated to a point where it is about to engage the cap 115 at the top of the column. Safety switch C makes it necessary to shift control knob to arm lowering position before the main motor can again be energized.

As best shown in Figure 5, the limit switches A, B, and C are enclosed by a cover 113 mounted upon housing 85. Cable conduits 116 and 117 extend from control cabinet 27 to cover 113 and from the cover to motor 17. Electric wires pass through the conduits and into electrical connection with the contacts of the switches for controlling the motor, as explained later.

Column clamp actuating mechanism

The column clamp actuating mechanism also operates throught its cycles under push-button control and forms a part of the present invention. The column clamp 20 is mounted upon a base portion 118 of the rotatable column 12 and establishes a clamping engagement with a cylindrical portion of the stump 11, so as to clamp the column to the stationary base (Figure 1). The clamping mechanism (not shown) is not essential to the present invention. The structure preferably is of the type shown in the aforesaid co-pending application, Serial No. 558,253, noted earlier.

The clamp is actuated by the square shaft 120 passing loosely through the sleeve 96 of the arm clamp (Figure 3). Shaft 120 has its upper end journalled in the column cap 115 (Figure 4) and its lower end journalled in the housing of the column clamp 20. Shaft 120 is rocked to clamping or unclamping position by a link 121 (Figures 1 and 16) located below the arm. The link has one end pivotally connected as at 122 to an actuating lever 123 which is rocked by the clamp actuating mechanism. This mechanism, as described later, is driven by the column clamp motor 21. The opposite end of actuating link 121 is pivotally connected as at 124 to a lever 125 having a hub 126 journalled for rocking motion in the arm. Hub 126 includes a square hole slidably embracing the square actuating shaft 120, such that the arm (and hub 126) is free to shift vertically along the column. Movements of link 121 thus impart rocking motion to shaft 120 for clamping or unclamping the column. The exact construction of hub 126 has been omitted since it forms no part of the present invention.

However, it will be noted in Figure 3 that column clamping shaft 120 is co-axial with arm clamping sleeve 96 and passes loosely through it. The reversible column clamping motor 21 is driven in clamping and unclamping directions in response to the push-buttons of the centralized control box 26. As shown in Figures 16 to 19, motor 21, which is mounted at the top of housing 127, includes a vertical shaft 128 upon which is keyed a pinion 130 meshing with a gear 131 within the housing. Gear 131 is keyed to a shaft 132 journalled in the housing and having keyed to it a pinion 133 meshing with a gear sector 134. The gear sector is secured upon a vertical shaft 135 having opposite ends projecting beyond the upper and lower walls of the housing 127 (Figure 16). The actuating lever 123 is mounted upon the lower portion of this shaft and preferably includes a split portion traversed by a screw 136 which draws the split portion into clamping engagement with shaft 135. This arrangement permits the actuating lever to be adjusted upon the shaft to the proper operating angle. The actuating lever 123 is further secured upon the shaft by a nut 137 threaded upon a stud portion of the shaft.

Figure 19:
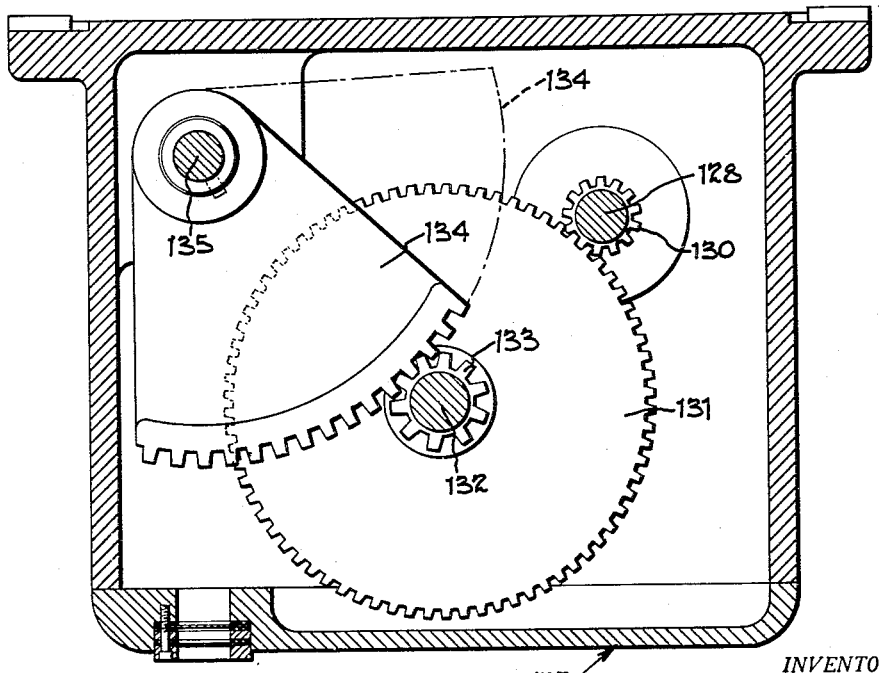
Figure 19 is a sectional view taken along line 19—19 of Figure 16, showing the gear train of the column clamp power mechanism.

In the position of parts shown in Figure 19, the column clamp is engaged upon rotation of the pinion and gear train to the unclamping position, as shown in broken lines, thus rocking the square shaft 120 to unclamping position through link 121 and actuating levers 123 and 125. It will be seen in Figure 19, that the gear train provides a reduction ratio from the motor pinion 130 to the gear sector 134.

The clamping motor is deenergized at the limits of its stroke by the limit switches E and F mounted on top of housing 127. These switches, as described with reference to the electrical circuit cause the motor to drive through its clamping or unclamping cycles and to be deenergized at the limits of travel in response to signals from control box 26.

The limit switches are actuated by a pair of cams 138 and 140 mounted one above the other upon the upper portion of shaft 135 of gear segment 134. To provide adjustment for the limits of motion, each cam includes a split hub 141 traversed by a clamping screw 142 which compresses the split portion and clamps the cam at the required setting on shaft 135. Each cam is generally in the form of a sector and each has a switch tripping lobe 143. The lobes of the two cams reside in opposite positions, such that the two switches alternately are tripped at the limits of clamping motion of shaft 135.

The switches E and F, which are identical, are of conventional design and each includes an insulated switch block 144 having a slidably mounted switch plunger 145 which carries a contactor 146. A compression spring 147 normally urges each plunger outwardly against an actuating lever 148 (one for each switch plunger). The actuating levers have their ends pivotally mounted upon a stub shaft 150 and each includes a roller 151 intermediate its length which bears against the arcuate surface of a respective cam. Each switch arm includes a tension spring 152 having one end anchored to the swinging end of the lever and its opposite end anchored upon a pin 153.

The position of the parts shown in full lines in Figure 17 corresponds with the clamping position shown in Figure 19. In this position, the lobe 143 of the lower cam depresses the plunger of the lower switch F while the upper switch E is in normal position. Upon shifting to unclamping position, as indicated in broken lines (Figures 17 and 19), the plunger of the upper switch E is depressed while the lower one F assumes its normal position. The contactors of these switches and their motor controlling function is explained in detail with reference to the electrical circuit.

The switching mechanism is enclosed by a cover 154 mounted upon the top of housing 127. The electrical conductors extend from the switch terminals through an opening in the cover to the control cabinet 27 by way of the T-shaped conduit 155 (Figures 3 and 4) which also extend to motor 21.

*Column safety mechanism*

Figure 20:
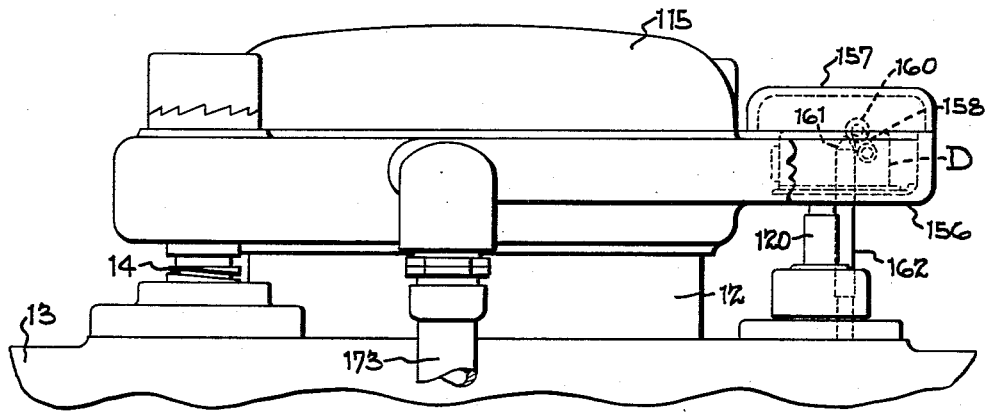
Figure 20 is a fragmentary view, similar to Figure 4, showing the arm elevated to the column cap, with the arm limit switch of the column cap tripped to stop the arm at its limit of travel.
Figure 21:
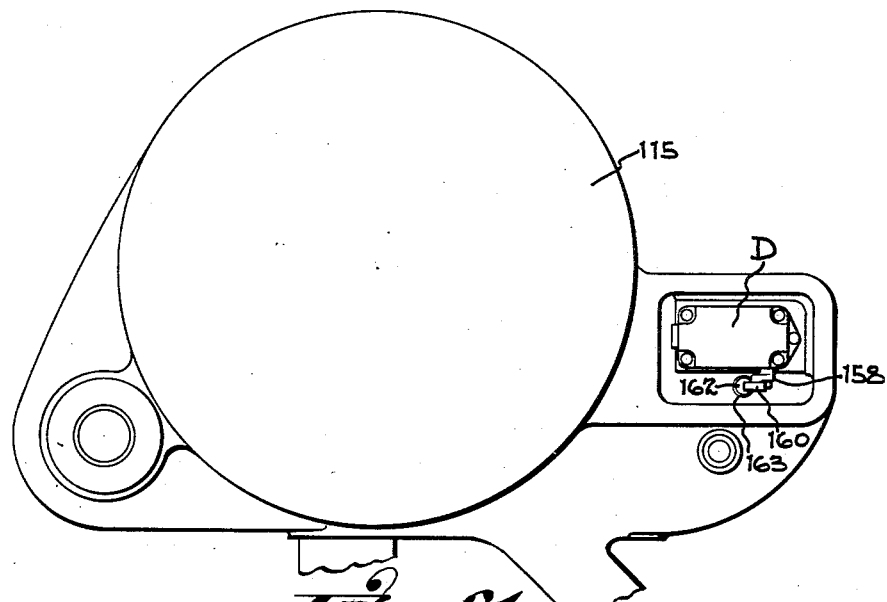
Figure 21 is a top plan view projected from Figure 20.

Referring to Figures 4, 20 and 21, the column closure cap 115 at the upper end of the column is provided with an outwardly projected casing 156 in which is mounted the safety limit switch D which deenergizes the main motor 23 when the arm reaches its upper limit of motion. The casing is provided with a cover 157 enclosing the switch. The switch includes an actuating arm 158 having a roller 160 at its outer end which is engaged by the tapered end 161 of a stud 162 rising upwardly from the arm. In the normal or working range of the travel, the stud 162 projects upwardly in axial alignment with a hole 163 in the bottom wall of the switch casing 156 with the switch arm extending horizontally in normal position. The contacts of limit switch D are interconnected with the control circuit as explained later. In the upper limit of arm travel shown in Figure 20, the switch contacts are open and the main motor 23 is deenergized.

*Centralized control box*

Referring to Figures 22–24, the centralized control box 26 consists of a housing 164 secured to one side of the drill head at the operator's side. The front panel 165 of the control box is provided with two rotary selector switches indicated at G and H and two push-button switches indicated at J and K. Selector switch G is actuated by the knob 23 and selector switch H is actuated by knob 166. Each knob has three positions as indicated.

When the selector knob 166 is in the dual position shown, the control circuit actuates both the column clamp motor 21 and head clamp motor 22 concurrently in response to actuation of the clamp or unclamp push-buttons J or K. When knob 166 is indexed either to the column or head position, then the clamp or unclamp buttons actuate only the selected clamp upon being depressed.

As noted earlier, the arm clamp is actuated in an automatic manner co-incidentally with the actuation of the elevating mechanism. Thus, in the indicated position of knob 33, the arm clamp is engaged and the elevating mechanism is inoperative. Upon being shifted to raise or lower position, the arm is unclamped and the raising or lowering clutch is engaged as explained earlier.

As shown in Figure 24, the body of each rotary switch G and H resides within the housing and includes terminals 167 which are interconnected in the control circuit. The switches are of conventional design and are clamped or otherwise secured to the panel 165 in the usual manner. Each knob 33 and 166 includes a flat gripping portion 168 for convenient operation and the exposed edge of the flat carries the arrow which registers with the indications on the panel.

As viewed in Figure 23, the body of each push-button switch J and K also includes terminals 170, likewise interconnected in the control circuit. The body of each switch, similar to the rotary switches, is clamped or otherwise secured in front panel 165. The construction of the switches is conventional and has not been illustrated.

Referring to Figure 23, the side of the control box includes a side panel 171 for mounting and start and stop push-button switches L and M which control the main motor 23. These switches are also interconnected in the control circuit.

*Electrical control system*

The electrical circuit shown in Figure 25 controls the operation of the main motor 23, column clamp motor 21, head clamp motor 22, and arm control motor 17 in response to the manual operation of the selector switches G and H and push-buttons J and K of the control box 26. The relays are mounted in the cabinet 27 of the arm, while the several limit switches shown in the control circuit are those which are mounted upon the rock shaft 41 and 135 of the arm elevating mechanism and column clamping mechanism.

The power lines and control lines of the circuit comprise the cable loop 172 (Figure 1) from the control cabinet to the top of the head, and cable loop 173 from the column to the drill head. Power is conducted to the several motors and control relays by a power cable (not shown) extending from the base of the machine through the column and connected to slip rings at the top of the column, thence by way of brushes in contact with the slip rings to the two cable loops. For the sake of simplicity, the cable loops have been omitted from the diagram.

Generally described, the control circuit comprises sets of relays for each of the three reversible control motors of the column, head and arm. The main motor, which is non-reversible, is started and stopped by a single relay.

Referring to Figure 25, electrical energy is supplied to the circuit from the three-phase power lines 174 which are connected by branch lines 175 to the main motor, and to the column, head and arm control motors. The control circuit is energized at lower voltage by a transformer 176 having its primary winding energized by the branch power lines 177. The secondary winding of transformer is connected to the supply lines 178 and 180 of the control circuit.

For simplicity, the circuits of the several relays are shown directly across the two supply lines 178 and 180 in a way which conforms to the relay designation in common use. The relays and their contacts are not shown physically connected; however, each relay and its contacts have a corresponding designation, for example, the contacts actuated by relay CC (column clamp) are indicated as CC in the control lines and power lines. The various switches and components of the control circuit are all shown in a neutral position corresponding to the setting of the selector knobs of Figure 22.

Head and column clamp circuits

Assuming that the operator has centered the drill spindle and wishes to clamp both the head and column, he may set the clamp selector switch H (knob 166) to dual position, then depress the clamp button switch K. Selector switch H includes two contacts 179 and 185. The clamp push-button switch is normally open and is interposed in branch line 181 extending from supply line 178, through the column clamp relay CC through selector contact 179 to the opposite supply line 180. Assuming that the column clamp is unclamped at this time, limit switch E in line 181 will be closed as indicated; therefore, relay CC will be energized. Upon being energized, relay CC opens its normally closed interlock contact in line 182 which leads to the unclamp relay CU so as to prevent the unclamp relay from being energized. The unclamp relay also includes a normally closed interlock contact CU in line 181 of relay CC. In addition, the two relays are interconnected by a mechanical interlock 183 indicated by the broken line to prevent simultaneous actuation.

Upon being energized, a relay CC closes its motor contacts CC in power branch lines 175 which energize the column clamp motor 21 in clamping direction. As the motor engages the column clamp, the cams of the column clamping mechanism open limit switch E of line 181 and close limit switch F in line 182. When limit switch E opens it deenergizes the relay CC, which opens motor contacts of branch lines 175 to stop the column clamp motor. Relay CC at this time closes its contact CC in line 182 and thus sets up a circuit for energizing unclamp relay CU when the unclamp push-button later is depressed.

Since clamp selector switch H is set for dual operation, the head clamp is also engaged when the clamp push-button switch K is closed. For this purpose, a branch line 184 extends from supply line 178 to energize head clamp relay HC. The head clamp mechanism (not shown) includes the limit switches N and O, similar to the switches E and F as shown in the co-pending application. With the head unclamped, limit switch N of the head clamp mechanism is closed and limit switch O is open as shown. Accordingly, the clamp push-button K will simultaneously energize head clamping relay HC by way of line 184, through the closed second contact 185 of selector switch H, thus completing the circuit from supply line 178 to supply line 180. Upon being energized, relay HC closes its motor contacts HC in power branch lines 175 to drive the head clamp motor in clamping direction. At final limit, the head clamping mechanism opens limit switch N and closes limit switch O.

This deenergizes the HC relay and opens its motor contacts to deenergize the head clamp motor. Relay HC includes a normally closed interlock contact HC in the line 186 which leads to the head unclamp relay HU to prevent the relay from being energized; a mechanical interlock 183 also interconnects the two relays.

It will be noted that the column clamp relay CC includes a normally open holding contact CC in branch line 187 which leads to the head clamp relay HC and column clamp relay CC. This contact insures operation of the column and head clamp mechanism when push-button switch K momentarily is closed. If relay CC or relay HC fails to close upon momentary operation of the switch, then holding contact CC of relay CC, or holding contact HC in branch line 184 will complete the circuit to both relays, both holding contacts being in common connection with both relays.

If selector switch H is shifted to the column position, then its contact 179 is shifted to a second closed position (contact 188) and contact 185 is opened. Accordingly, upon actuation of the clamp switch K, relay CC will be energized, as described above, to clamp the column, but relay HC will not be energized.

If selector switch H is shifted to the head position, then its contact 179 will be opened and its contact 185 will be closed in its second position (contact 190). In this setting therefore, the column clamp relay CC will remain deenergized and only the head clamp relay HC will be energized to clamp the head when switch K is closed.

Column and head unclamping

If the column and head are clamped and it is desired to unclamp both of them, then selector switch H is placed in the dual control position and the unclamping push-button J momentarily is depressed. This completes the circuit from supply line 178, branch line 182, through limit switch F (now closed) through closed interlock contact CC, through unclamping relay CU, and through the closed contact 179 of selector switch H to supply line 180. Upon being energized, relay CU closes its holding contact CU in line 181, allowing the push-button J to be released. Relay CU also closes its motor contacts CU in the reverse branch lines 191 to the column clamp motor, causing motor rotation in unclamping direction. At the limit of unclamping motion, the column unclamping mechanism opens its limit switch F to deenergize relay CU and open the reversing motor contacts CU of the power reverse lines.

Since the selector switch H is in its dual position, it will also signal the head unclamp relay HU by way of branch line 186, through the unclamp contact O (now closed) and by way of branch line 192, through unclamp switch J, or through the holding contact CU (now closed) of line 193. A holding contact HU in line 186, now closes to keep relay HU energized until the end of the cycle. The head unclamping relay HU also closes its motor contacts HU in the reverse power lines 191 to the head clamp motor. The head clamp motor then operates the head mechanism in unclamping direction until, at the limit of motion, the head mechanism opens limit switch O in line 186 to deenergize relay HU, causing its motor contacts to open and deenergize the head clamp motor. At this time, the companion limit switch N of the head clamping mechanism closes to set up the circuit for motor rotation in head clamping direction upon subsequent operation of the clamping button.

If selector switch H is shifted to the column position then the above described circuit will be completed to the column unclamp relay CU, through contact 179 to its second point 188 of selector switch H. Since the contact 185 of the selector switch H is now opened, the circuit will not be completed through the head unclamping relay HU; hence, the column will be unclamped but the head will remain in clamped position.

In a similar manner, if the selector switch H is shifted to its head position, then its contact 179 is opened and its companion contact 185 engages point 190. Accordingly, when the unclamp button J is depressed, the circuit is completed only to the head unclamp relay HU to unclamp the head, while the column remains clamped.

*Arm control*

As noted earlier, when the arm selector switch (knob 33) is in intermediate position, the arm is clamped to the column and the clutches of the arm elevating mechanism are disengaged. In this position, brake 54 is engaged to lock the elevating nut in stationary position. When the selector switch is shifted from the intermediate position, either in the arm raising or lowering direction, then the arm clamp is disengaged by operation of arm motor 17, which rotates rock shaft 41 (Figure 15) in the direction indicated for raising or lowering.

Upon being rocked to its unclamping limit of motion, the rock shaft trips the limit switches A or B, either of which conditions the control circuit to deenergize the arm clamp. At this time, the rock shaft also engages one or the other of the clutches 35 or 36 to drive the arm in the indicated direction. The elevating mechanism, through the main motor 23, continues to drive the arm in the selected direction (with its main motor 17 deenergized) until switch G is shifted back to the intermediate arm clamping position. At this point, the control circuit reverses the arm motor 17 to rotate rock shaft 41 back to the intermediate position, thus disengaging the clutches, setting the brake, and engaging the arm clamp.

Since the elevating mechanism is powered from the main motor 23, it is necessary that this motor be energized before it is possible to raise or lower the arm. Referring to the diagram of Figure 25, the main motor is energized by depressing start button L (Figure 23) in branch line 194 so as to complete the circuit through motor relay MM across supply lines 178—180. Upon being energized, relay MM closes its holding contact MM in line 195, which shunts the start button to keep relay MM energized after the start button is released. Upon being energized, relay MM closes its motor contacts MM in the power lines 175, which energize the main motor.

It is to be noted at this point, that the column upper limit switch D includes a normally closed contact 196 which completes the circuit to relay MM. If the arm is elevated beyond its limit, contact 196 will be opened by stud 162 to deenergize relay MM and to stop the main motor before the arm contacts the column cap. When this occurs, the main motor can be restricted only by shifting selector switch G to its arm lowering position, as explained later.

As shown in the diagram, limit switch A (Figure 15) includes a normally closed contact 197 in branch line 198 and a normally open contact 200 in branch line 201. These contacts are mechanically interconnected as indicated by the broken line. Limit switch B also includes two contacts 202 and 203 which are mechanically interconnected as indicated by the broken line. When the cam and switches are in the neutral position shown in Figure 15, the contacts of the switches are in the position shown in the diagram.

The selector switch G also includes two contacts indicated at 204, and 205, which are mechanically interconnected, as indicated by the broken line. When selector contact 204 is in its intermediate or clamping position (or in its elevating position) its companion contact 205 is open as indicated; when selector contact 204 is shifted to arm lowering position, then its companion contact 205 is closed. This completes a circuit for energizing the main motor in the event that it has been deenergized by the safety limit switch D of the column cap. This arrangement permits the main motor to be energized only by shifting selector G (contact 204) to arm lowering position after having tripped safety limit switch D. This circuit is explained in greater detail later.

*Arm raising*

When selector switch G is shifted to arm raising position, its contact 204 completes a circuit from supply line 178, branch line 206, through raising relay R, to supply line 180. Relay R then closes its contact R in branch line 198, through normally closed contact 197, through normally closed interlock contact LU, through the up relay RU to supply line 180. Relay RU then closes its motor contacts RU in power lines 175 to drive the arm control motor 17 in arm raising direction, causing rotation of the rock shaft as indicated at Figure 15. As the rock shaft rotates, it rotates the clamping cam 97 from the intermediate clamping position (Figure 10) thus releasing the arm clamp. The unclamping cycle continues until cam 108 (Figure 15) shifts the limit switch A to its second position, thus opening normally closed contact 197 and closing normally open contact 200.

When contact 197 opens at the end of the cycle, relay RU is deenergized and the motor contacts RU are opened to deenergize the arm control motor. At this point, the elevating clutch is engaged and the brake is disengaged, therefore the arm will continue elevating (with motor 17 deenergized) so long as the selector knob remains in arm raising position.

When selector switch G is shifted back to neutral, arm motor 17 is rotated in reverse to shift the limit switches back to the position shown in Figures 15 and 25. When normally open limit switch 200 (branch line 201) closes at the end of the cycle, it establishes this neutralizing circuit. For this purpose, there is provided a holding contact RU in branch line 207 which by-passes relay RU; there is also provided a holding contact R in branch line 208. Contact R energizes a holding relay HRR in line 210. Holding relay HRR includes a holding contact HRR in line 207. These holding contacts (which are now closed) open when contact 197 (limit switch A) opens at the raising limit of motion.

Since contact 200 (limit switch A) now closes, a circuit is established from supply line 178, to the lowering relay L for motor reversal. This circuit is by way of branch line 201, closed contact 200, through normally closed contacts R and L of line 211 (R and L now being deenergized). The circuit is completed by line 212, line 213, normally closed contact 203 (limit switch B) to line 214. The circuit is completed through normally closed line 215, and line 198, to supply line 180. Upon being energized, relay LU closes its motor contacts LU in reverse power lines 191 to drive the arm motor in arm lowering direction as indicated by the arrow in Figure 15.

When the normally open contact 200 (limit switch A) closes for the neutralizing cycle as above described, the motor continues in reverse until the rock shaft returns to its neutral position to open contact 200 and close contact 197 of limit switch A. This deenergizes relay LU, causing it to open its motor contacts LU and stop the arm motor with the rock shaft at neutral, both clutches being disengaged and the arm clamp engaged. The limit switches and relay contacts are now in the position shown in the diagram.

*Column limit switch*

As explained earlier, the column limit switch D prevents the arm from contacting with the column cap. As shown in the diagram, the limit switch includes a normally closed contact 196 and a normally open contact 216 in lines 194 and 217. If the arm shifts plunger 162 upwardly, contact 216 closes and contact 196 opens. Accordingly, the main motor relay MM of line 194 is deenergized to open the main motor relay MM of line 175. Since the main starting switch is interposed in line 194, the main motor cannot be started by depressing main starting switch L; instead, it can be started only by shifting selector switch G to the arm lowering position.

For this purpose, the selector switch includes the second contact 205, mechanically connected to contact 204, as indicated by the dotted line. When contact 204 is shifted to raising direction, its companion contact 205 is opened; when contact 204 is shifted to lowering position, its companion contact 205 closes. Accordingly, a circuit is established from supply line 178, branch line 213, closed contact 205, safety switch C, and the closed contact 216 of the column limit switch D. This starts the main motor; however, the arm elevating mechanism will have been conditioned for arm lowering, causing the main motor to begin lowering the arm when the motor starts. As the arm lowers, it closes contact 196 and opens contact 216 of the column limit switch to place the main motor under the control of its start and stop switches L and M.

As noted earlier, safety interlock switch C is normally closed and is opened by its cam when rock shaft 41 rotates to elevating position. Its purpose is to guard against damage in the remote contingency of failure in the control circuit. For example, such failure may possibly cause the arm to continue elevating when selector switch G is shifted to lowering position. In this case, the rock shaft will have been shifted to elevating position and interlock switch C will be open; therefore, even though contact 205 of selector G is closed, switch C will be open to deenergize the main motor at the upper limit of arm travel.

*Arm lowering*

When selector switch G is shifted to the arm lowering position, its contact 204 establishes a circuit from supply line 178, branch line 220, line 221, through the normally closed interlock contact R, and through relay L to supply line 180.

Upon being energized, relay L closes its contact L in line 214 to establish a circuit from supply line 178 through closed contact 203 (limit switch B) through interlock contact RU and through relay LU, branch lines 215 and 198 to supply line 180. Relay L also closes a contact L in branch line 224 to energize relay HRL. Relay LU also closes motor contacts LU in reverse power lines 191 to energize arm motor 17 in the arm lowering direction. Relay RU and LU are mechanically interlocked as at 183.

Relay LU also opens its interlock contact LU (line 198) and closes its holding contact LU in branch line 222 to energize the holding relay HRL in line 223. Relay HRL in turn closes its contact HRL in branch line 222 which also includes the contact LU now closed by the energized relay LU. The circuits of branch lines 222 and 224 thus establish a holding circuit which keeps the relay LU energized until motion of the rock shaft in the unclamp direction is completed.

At the limit of rock shaft motion, normally closed contact 203 (limit switch B) opens to deenergize relay LU, thus opening the motor contact LU to deenergize the arm motor and to deenergize the holding circuit of branch line 222 and 224, causing holding relay HRL also to be deenergized. Since the arm holding clutch is engaged, the arm will continue in its downward motion so long as the selector contact 204 is shifted in its lowering position to keep relay L energized.

Upon rotating to its limit in the lowering direction, the rock shaft also closes contact 202 (limit switch B) in line 225. This establishes a circuit for shifting the arm clamp motor and rock shaft back to the neutral or clamping position when selector switch G is shifted to clamping position.

When this occurs, relay L is deenergized, closing its normally open contact in line 225. The neutralizing circuit is completed to relay RU from supply line 178, line 225, closed contact 202 (limit switch B) lines 225, 211, through contacts R and L, which are now closed. The circuit is completed through branch line 226, contact 197 (limit switch A), line 198, closed contact LU, through relay RU to supply line 180. Relay RU now closes its motor contacts RU in lines 175 to drive the arm motor and rock shaft toward neutral.

Upon reaching the neutral position, the rock shaft opens contact 202 (limit switch B) and thus deenergizes the relay RU and the arm motor to decommission the driving mechanism and to stop the rock shaft in its neutral position with the arm clamped. The contacts of limit switches A and B are now in the position shown in the diagram and the circuit is ready for the next raising or lowering operation.

Having described my invention, I claim:

1. A centralized control apparatus for a radial drill having a column, a column clamp, an arm, a shiftable, power-driven arm elevating mechanism, a head on the arm, and a head clamp mounted in said head, said control apparatus comprising, a reversible arm control motor connected to the arm elevating mechanism, a reversible column clamp motor connected to the column clamp, a reversible head clamp motor connected to the head clamp, a centralized control unit mounted on the head, a manually operated arm control switch on said control unit, said switch having an intermediate position having an arm raising position and having an arm lowering position, a manually operated clamp selector switch in said control unit, said switch having a dual clamping position, having a column clamp position, and having a head clamp position, a clamping switch in said control unit, an unclamping switch in said control unit, a control system electrically interconnecting said motors and said switches of the control unit, said arm control motor normally residing in an intermediate position disengaging the shiftable arm elevating mechanism, said control system energizing the arm control motor in forward or reverse to shift the power-driven elevating mechanism in respective directions to raise or lower the arm in response to actuation of the arm selector switch from said intermediate position to said raising or lowering position, the control circuit interconnecting the column clamp motor and head motor when said clamp selector switch is in said dual clamping position, the control system energizing both of said motors in forward or reverse direction to engage or disengage the head and column clamps upon actuation of said clamp or unclamp switches, the control system actuating said motors individually in forward or reverse directions in response to actuation of the clamp or unclamp switch, when said selector switch is shifted to said column clamp or head clamp position.

2. A control apparatus for a radial drill having a column, a column clamp, a head, and a head clamp mounted in said head, said control apparatus comprising, a reversible column clamp motor connected to the column clamp, for clamping and unclamping the same, a reversible head clamp motor connected to the head clamp for clamping and unclamping the same, a centralized control unit mounted on the head, a clamp selector switch in said control unit, said switch having a dual clamping position, having a column clamp position and having a head clamp position, a clamping switch in said control unit, an unclamping switch in said control unit, a control system electrically interconnecting said motors and said switches of the control unit, said control system interconnecting the column clamp motor and head motor when said clamp selector switch is in said dual clamping position, the control system energizing both of said motors in forward or reverse direction to engage or disengage the head and column clamps upon actuation of said clamp or unclamp switch, the control system actuating said motors individually in forward or reverse directions in response to actuation of the clamp or unclamp switch when said selector switch is shifted to said column clamp or head clamp position.

3. A control apparatus for a radial drill having a column, an arm, a shiftable power-driven arm elevating mechanism, and an arm clamp engageable with the column, said control apparatus comprising, a reversible arm control motor, a manually actuated arm control switch electrically connected to said motor, said switch normally residing in a neutral position and deenergizing said arm control motor, said switch energizing said motor in forward or reverse directions in response to actuation of the switch in either direction from said neutral position, driving means connecting said motor to said arm elevating mechanism and to said arm clamp, said driving means normally residing in a neutral position, said driving means engaging said arm clamp in said neutral position, said driving means disengaging said arm clamp and driving the said elevating mechanism in arm raising or lowering direction upon being shifted in respective directions from said neutral position by operation of said reversible arm control motor, a pair of limit switches in electrical connection with said motor, switch actuating means in driving connection with the motor and engageable with said limit switches at the limit of motion of said driving means in arm raising or lowering direction, said limit switches deenergizing said arm control motor at said limits of motion of the elevating mechanism in arm raising or lowering position, whereby the mechanism continues raising or lowering the arm with the arm control motor deenergized.

4. A control apparatus for a radial drill having a column, an arm, a shiftable power-driven arm elevating mechanism, and an arm clamp engageable with the column, said control apparatus comprising, a reversible arm control motor, a manually operated arm control switch, said switch normally residing in a neutral position, a control system interconnecting the said switch and motor, said control system energizing said motor in forward or reverse directions in response to actuation of the switch in either direction from said neutral position, means coupling said motor to said arm elevating mechanism and to said arm clamp, said coupling means normally residing in a neutral position and engaging said arm clamp and disengaging the elevating mechanism, said coupling means disengaging said arm clamp and driving the said elevating mechanism in arm raising or lowering direction upon being shifted in respective directions from said neutral position in response to said arm control switch, a pair of limit switches in electrical connection with said motor, switch actuating means in driving connection with the coupling means and engageable with said limit switches at the limit of motion of said coupling means in arm raising or lowering direction, said control system deenergizing said arm control motor in response to tripping of the limit switches at said limits of motion of the coupling means, said control system energizing said motor in a direction to shift the coupling means back to said neutral position when the arm control switch is shifted back to said neutral position, said control circuit deenergizing said motor when the coupling means is shifted back to said neutral position, thereby to decommission the elevating mechanism and to engage the arm clamp.

5. A control apparatus for a radial drill having a column, an arm, a shiftable power-driven arm elevating mechanism, and an arm clamp engageable with the column, said control apparatus comprising, a reversible arm control motor, a manually operated arm control switch, said switch normally residing in a neutral position, a control system interconnecting the said switch and motor, said control system energizing said motor in forward or reverse directions in response to actuation of the switch, in either direction from said neutral position, a rock shaft in driving connection with said motor and connected to said arm elevating mechanism and arm clamp for actuating the same, the rock shaft normally residing in a neutral position, and engaging said arm clamp and disengaging the elevating mechanism, said rock shaft disengaging said arm clamp and driving the said elevating mechanism in arm raising or lowering direction upon being rotated in respective directions from said neutral position in response to said arm control switch, a pair of limit switches in electrical connection with said control system, switch actuating means connected to said rock shaft and engageable with said switches, said switch actuating means tripping said switches at the limit of rotation of said rock shaft in arm raising or lowering direction, said control system deenergizing said arm control motor in response to the tripping of said limit switches at said limits of motion of the rock shaft, said control system energizing said motor in a direction to rotate the rock shaft back to neutral position when the arm control switch is shifted back to said neutral position, said control system deenergizing said motor when the rock shaft is rotated back to said neutral position, thereby to decommission the elevating mechanism and engage the arm clamp.

6. A control apparatus for a radial drill having a column, an arm, a head, and a power-driven elevating mechanism including shiftable coupler means for driving the elevating mechanism in arm raising or lowering directions, said control apparatus comprising, a reversible arm control motor, a control unit mounted on the head, an arm control switch in said unit having a shiftable element for manual operation thereof, means electrically interconnecting the control switch with said motor, said switch normally residing in an intermediate position and energizing said motor in forward or reverse directions in response to movement of said switch actuating means in respective directions from said intermediate position, means connecting said motor to the shiftable coupler means of the elevating mechanism, whereby the elevating mechanism is driven in arm raising or lowering directions in response to the position of said arm control switch, a pair of limit switches in electrical connection with said motor, switch tripping means in driving connection with said motor and engageable with said limit switches, said limit switches deenergizing said motor independently of the selector switch at the limits of motion of the shiftable control means of the elevating mechanism, whereby the said mechanism continues raising or lowering the arm with the arm control motor deenergized, and arm limit means residing at the upper portion of the column and interconnected with said power-driven elevating mechanism, said limit means engaged by the arm at the limit of travel thereof and decommissioning said elevating mechanism.

7. A control apparatus for a radial drill having a column, an arm, a main motor, an elevating mechanism in driving connection with the main motor and including a shiftable coupling device for driving said mechanism in forward and reverse directions thereby raising or lowering the arm along the column, said control apparatus comprising, a reversible motor in driving connection with said coupling device, said motor shifting the coupling device to said forward and reverse positions, an arm control switch having a shiftable element for manual operation thereof, an electrical control system interconnecting said reversible motor and control switch, said control system energizing the motor in forward and reverse directions in response to actuation of the arm control switch, limit switch means in electrical connection with said control system, a switch actuating element in driving connection with the reversible motor, said switch actuating element tripping said limit switch means at the limits of motion of said shiftable coupling device, said control system deenergizing the motor at said limits of motion in response to the tripping of said switches, an arm limit switch mounted on the column and electrically interconnected with said main motor and normally energizing the same, said arm engaging and tripping the arm limit switch at a limit of arm travel and thereby deenergizing the main motor and elevating mechanism in response to the tripping of the arm limit switch.

8. A control apparatus for a radial drill having a column, an arm, a main motor, an elevating mechanism in driving connection with said main motor, said mechanism including a shiftable coupler for driving the mechanism in forward and reverse directions, whereby the main motor raises or lowers the arm, said control apparatus comprising, a reversible arm control motor connected to said shiftable coupler, an arm control switch having a shiftable element for a manual operation thereof, an electrical control system interconnecting the reversible motor and arm control switch, said control switch having contacts in electrical connection with the control system, the control system energizing said motor in forward or reverse directions in response to the position of the arm control switch, whereby the elevating mechanism is driven in arm raising or lowering directions in response to manual operation of the arm control switch, a pair of limit switches in electrical connection with the control system, switch actuating means in driving connection with the arm control motor, said switch actuating means engageable with said limit switches and tripping the same alternately at the limits of motion of the shiftable coupler, said control system deenergizing the arm control motor at said limits of motion in response to the tripping of said limit switches, an arm limit switch mounted on the column and engageable by the arm at the upper limit of arm travel, said arm limit switch electrically connected to the main motor and normally energizing the same, the arm limit switch deenergizing the main motor upon being engaged by the arm, and a second switch in driving connection with said arm control switch, said second switch being normally open and being in electrical connection with the said main motor, said second switch closing and energizing the main motor when the arm control switch is shifted to said arm lowering position, whereby the arm control motor and control system shifts the arm coupling element to a position for lowering the arm, and the main motor lowers the arm after having been deenergized by said arm limit switch.

9. A control apparatus for a radial drill having a column, a main motor, and a shiftable elevating mechanism for raising or lowering the arm, said control apparatus comprising, a rock shaft connected to the arm elevating mechanism, said rock shaft normally residing in a neutral position and disengaging the elevating mechanism, said rock shaft engaging the elevating mechanism to raise or lower the arm upon being shifted in alternate directions from said neutral position, a reversible arm control motor connected to the rock shaft for shifting the same, a manually actuated arm control switch interconnected with said motor, said switch having a neutral position, said arm control switch energizing the arm motor in forward and reverse directions in response to actuation in alternate directions from said neutral position, a second contact in driving connection with the arm control switch, said second contact being closed when the arm control switch is shifted to arm lowering positions, and an arm limit switch mounted on the column and engaged by the arm at a limit of arm travel, said switch having a normally closed contact and a second normally open contact, said closed contact normally energizing the main motor, said normally open second contact closing upon engagement of the arm limit switch by the arm, the second contact of the arm control switch being in series with the second contact of the arm limit switch and establishing a second circuit for energizing the main motor after the same is deenergized by said arm limit switch, said second circuit being completed upon shifting of the arm control switch to arm lowering position.

10. A control apparatus for a radial drill having a column, an arm, a main motor, and a shiftable arm elevating mechnism in driving connection with said motor, said control apparatus comprising, a reversible arm control motor, a manually operated arm control switch, said switch normally residing in a neutral position, a control system interconnecting the said switch and arm control motor, said control system energizing said arm control motor in forward or reverse directions in response to actuation of the switch in either direction from said neutral position, a rock shaft in driving connection with the arm motor and connected to said arm elevating mechanism and arm clamp for actuating the same, the rock shaft normally residing in a neutral position disengaging the elevating mechanism, said rock shaft driving the said elevating mechanism in arm raising or lowering direction upon being rotated in respective directions from said neutral position in response to said arm control switch, a pair of limit switches in electrical connection with said control system, switch actuating means on said rock shaft engageable with said limit switches, said switch actuating means tripping said switches at the limit of rotation of said rock shaft to arm raising or lowering position, said control system deenergizing the said arm control motor in response to the tripping of said limit switches at said limits of motion of the rock shaft, a normally closed safety interlock switch, actuating means on the rock shaft opening said switch when the rock shaft is rotated to arm raising position, a second normally open arm control switch in driving connection with said arm control switch, said second switch being closed when the arm control switch is shifted to arm lowering position, said interlock switch and second arm control switch being connected in series with one another and completing a circuit to the main motor when the rock shaft is in said arm lowering position and said arm control switch is in arm lowering position, said switches thereby opening said circuit if either the rock shaft or control switch is in arm raising position.

11. In a control apparatus for a radial drill having a column, an arm, a main motor, and an arm elevating mechanism in driving connection with said main motor, an apparatus for limiting the elevating motion of the arm along the column comprising, a control system for shifting the arm elevating mechanism to arm raising or lowering operations, a manually operated arm control switch interconnected in said control system, said switch normally residing in a neutral position and driving the elevating mechanism in arm raising or lowering direction upon being shifted from said neutral position, a power circuit for energizing said main motor, an arm limit switch interposed in said power circuit, said safety switch having a normally closed contact in said power circuit normally energizing the said main motor, a second power circuit connected to the main motor, said limit switch having a second arm control contact interposed in said second power circuit, said second arm control contact being in driving connection with the arm control switch, said second arm control contact being normally open and being closed when the arm control switch is shifted to a position for lowering the arm, actuating means interconnecting the arm limit switch and arm, said actuating means engaging the arm limit switch at the upper limit of arm motion and shifting said switch to a second position, whereby the normally closed contact is opened and deenergizes the main motor and said second contact thereof is closed in said second power circuit, the second arm control contact thereby energizing the main motor upon shifting of the arm control switch to a position for lowering the arm.

12. In a control apparatus for a radial drill having a column, an arm, a main motor, and a shiftable arm elevating mechanism in driving connection with said main motor, an apparatus for deenergizing the main motor in response to upward motion of the arm to a predetermined limit, said apparatus comprising, a control system shifting said elevating mechanism in arm raising or lowering direction, an arm control switch interconnected with said control system, the arm control switch normally residing in a neutral position and shifting the elevating mechanism in arm raising or lowering direction upon being shifted from said neutral position, a power circuit normally energizing the main motor, a second power circuit connected to the main motor, a second arm control contact interposed in the second power circuit, said second contact being in driving connection with the arm control switch and being closed when the arm control switch is shifted to an arm lowering position, an interlock switch interposed in said second power circuit, said interlock switch being interconnected with the arm elevating mechanism, said interlock switch being opened when said elevating mechanism is shifted to drive the arm in elevating direction, and an arm limit switch engageable by the arm at said upper limit of arm motion, said arm limit switch having a normally closed contact in said first power circuit energizing the main motor, the limit switch having a second normally open contact in the second power circuit, said second contact of the arm limit switch being closed upon engagement by the arm at said limit of motion, whereby the main motor is energized through the interlock switch, second contact of the arm control switch and second contact of the limit switch when the arm control switch is shifted to arm lowering position after the arm limit switch is tripped by the arm at said upper limit of arm motion.

13. In a control system for a radial drill having an electrically operated arm elevating mechanism and electrically operated head and column clamps, a centralized control unit for controlling the operation of the elevating mechanism, head clamp and column clamp, said control unit comprising, a centralized switch panel, a front panel, a rotary switch mounted on said panel for controlling said arm elevating mechanism, said switch having an actuating knob residing on an exposed face of said panel, said knob and switch having an intermediate position and being rotatable selectively to an arm raising or lowering position, a control circuit, said switch interconnected with said control circuit and energizing the electrically operated arm raising and lowering mechanism in response to rotation of said knob and switch to a raising or lowering position, a rotary clamp selector switch mounted on said panel, said switch having an actuating knob residing on an exposed face of said panel, said switch and knob having a dual position and being rotatable selectively to a head clamp position and column clamp position, said switch being interconnected with the control circuit and establishing a circuit to said electrically operated head clamp and column clamp simultaneously when shifted to said dual position and establishing a circuit individually thereto upon being shifted to respective positions from said dual position, and a pair of push-button switches mounted adjacent the clamp selector switch, said pushbuttons completing the circuit to said electrically operated clamps either simultaneously or individually in response to the position of the clamp selector knob and switch.

14. In a control system for a radial drill having an electrically operated arm elevating mechanism and electrically operated head and column clamps, a centralized control unit for controlling the operation of the elevating mechanism, head clamp and column clamp, said control unit comprising, a centralized switch panel, a rotary switch mounted on said panel for controlling said arm elevating mechanism, said switch having an actuating knob residing on an exposed face of said panel, said knob and switch having an intermediate position and being rotatable selectively to an arm raising or lowering position, a control circuit, said switch interconnected with said control circuit and energizing the electrically operated arm raising and lowering mechanism in response to rotation of the knob and switch to a raising or lowering position, a rotary clamp selector switch mounted on said panel and having an actuating knob residing on the exposed face of said panel, said switch and knob having a dual position and being rotatable selectively to a head clamp position or to a column clamp position, said switch being interconnected with the control circuit and establishing a circuit to said electrically operated head clamp and column clamp simultaneously when shifted to said dual position and establishing a circuit individually thereto upon being shifted to respective positions from said dual position.

References Cited in the file of this patent

UNITED STATES PATENTS

| | | |
|---|---|---|
| 1,684,344 | Carlton | Sept. 11, 1928 |
| 1,825,181 | De Roo | Sept. 29, 1931 |
| 1,875,017 | Klausmeyer | Aug. 30, 1932 |